United States Patent Office 3,506,556
Patented Apr. 14, 1970

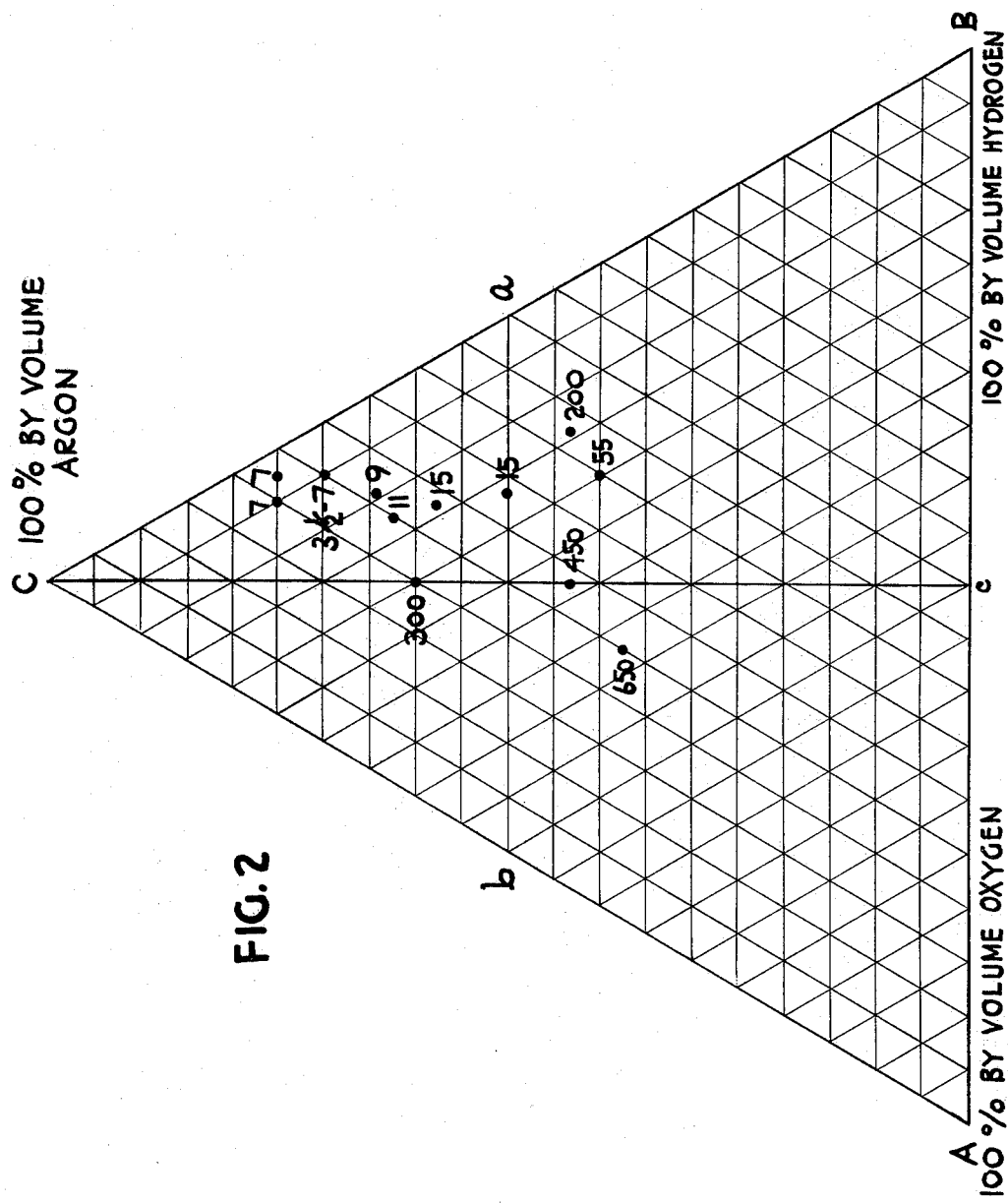

3,506,556
SPUTTERING OF METAL OXIDE FILMS IN THE PRESENCE OF HYDROGEN AND OXYGEN
Frank H. Gillery, Allison Park, and Jean P. Pressau, Evans City, Pa., assignors to PPG Industries, Inc., a corporation of Pennsylvania
Filed Feb. 28, 1968, Ser. No. 709,055
Int. Cl. C23c *15/00*
U.S. Cl. 204—192                                                          10 Claims

ABSTRACT OF THE DISCLOSURE

This invention relates to a novel method of producing conductive metal oxide films by cathodic sputtering. It especially pertains to cathodic sputtering of metal oxide films from a metal having an atomic number of between 48 and 51, particularly indium, in an atmosphere containing oxygen and hydrogen. It especially pertains to the production of doped metal oxide films, by sputtering in an atmosphere containing hydrogen and oxygen from a cathode possessing two metals, one being an element of a different valent state from the dominant metal or from oxygen.

BACKGROUND OF THE TECHNOLOGY

Figure 1:
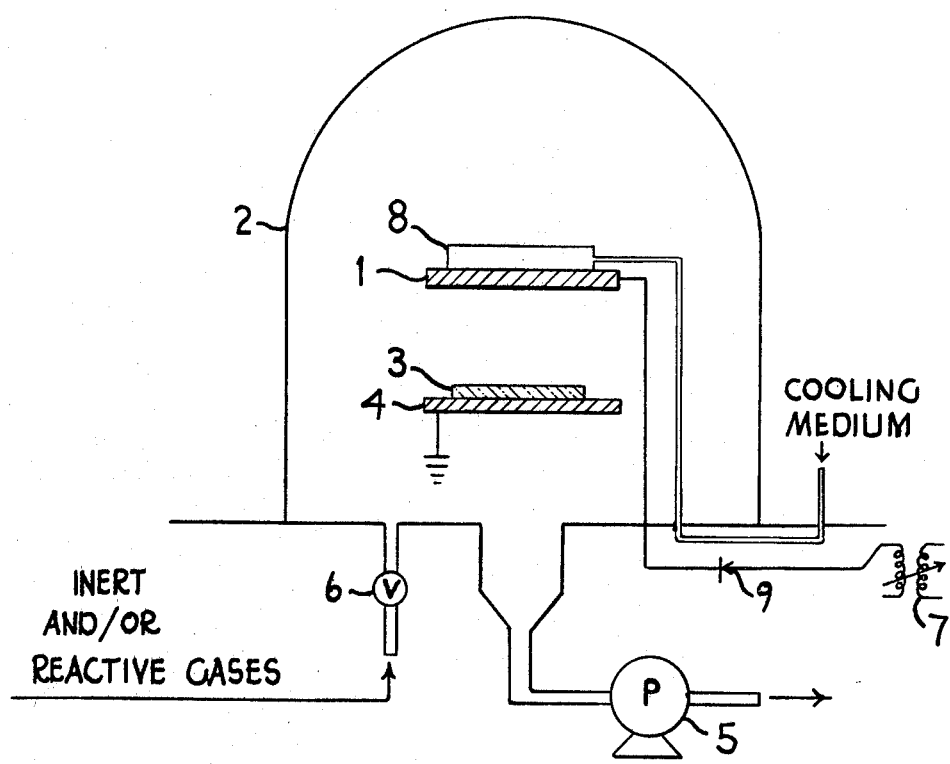

The deposition of metals and metal oxide films by cathodic sputtering is a well-known process. Holland, in his text, "Vacuum Deposition of Thin Films," Chapman and Hall, Ltd., London (1963), discusses the technology of cathodic sputtering at considerable length in chapters 14, 15 and 16. In cathodic sputtering processes, the applied voltage energizes gaseous ions in a vacuum chamber and causes such ions to strike a cathode, thereby displacing a metal particle. The metal particle migrates to the surface to be coated, said substrate frequently being an anode.

In cathodic sputtering processes, an atmosphere greatly-reduced pressure is necessary to provide the proper conditions for a glow discharge to occur between cathode and anode. A glow discharge energizes ions present between the cathode and anode.

An alternate technique for depositing metal oxide films on a substrate comprises contacting the heated substrate with a metal salt or organo metallic compound which pyrolyzes at the temperature of the substrate to form thereon an adherent metal oxide film. One disadvantage of pyrolyzation processes resides in the elevated temperatures necessary for depositing a suitable metal oxide film. When glass is utilized as the substrate, for example, the necessary pyrolyzation temperatures approaches the softening point of the glass, thereby causing undesirable optical distortion in the glass. Cathodic sputtering processes, however, do not require the substrate to be heated to elevated temperatures. Such processes are especially amenable, therefore, for producing transparent metal oxide films on high-quality optical glass substrates at a temperature substantially less than the softening point of said substrates.

Metal oxide films, regardless of the method of application, have one disadvantage in comparison with metal films: low conductivity. Transparent tin oxide films, for example, frequently have a resistance of over 2000 ohms/square for a 6000 A. thick film (specific resistivity of about 0.12 ohm-centimeter), while pure metallic films such as tin or copper may have a resistance of less than 1 ohm/square for similar film thickness. Thin metal oxide films, however, have much better adhesion, durability, and light transmission than pure metal films. One objective of research in this area has been to develop an adherent metal oxide film which has a conductivity approaching that of the metal films.

One successful approach towards improving the conductivity of a metal oxide film has involved "doping" with another metal, generally one of a higher valence. The "doping" metal apparently takes a position in the lattice of the metal oxide film and provides a greater electron density.

The doping of vacuum-deposited tin oxide films with antimony has produced transparent tin oxide films having a resistance of less than 1000 ohms/square. Such developments have been recorded by Holland in his text, supra, at p. 497. Indium oxide films, for example, doped with tin have been produced by sputtering to resistances as low as about 35 ohms/square at about 6000 A.

Another approach towards reducing resistivity of metal oxide films is disclosed in U.S. Patent 2,769,778 of Preston. Tin oxide films having resistances of about 500 to 1000 ohms/square for films of $5 \times 10^{-6}$ centimeter (500 A.) were obtained by sputtering from a tin cathode of high purity in an atmosphere of argon containing a trace of air and heating the film for 5 minutes at 350° C. in air.

INVENTION

It has now been discovered that metal oxide films especially indium oxide, of increased conductivity can be produced from metal cathodes by sputtering in an atmosphere containing hydrogen as well as oxygen. An inert gas may also be present and is generally preferred to enhance the rate of deposition of metal oxide.

The invention may be practiced by sputtering from a metal cathode, preferably a metal cathode containing a small amount of a contaminant metal (dopant) of a potentially-higher valent state, onto a substrate of glass, plastic, or other material. The substrate may be either hot or cold.

Typically in sputtering processes, the substrate is not cool. However, in this invention it has been found that improved films have been formed by sputtering on cooled substrates; making the process easier to control and allowing a greater voltage to be applied Cooling of the substrate should be conducted so that a substrate temperature of less than 300° C. occurs during sputtering, and preferably a temperature of about 50° C. to about 250° C. is maintained.

A typical illustration of this invention involves sputtering from an indium cathode containing a small quantity, that is, between 1 and 15 percent of tin, in a vacuum. (If a tin cathode is used then a small quantity of antimony is included as a dopant.) The atmosphere of the sputtering apparatus may contain from 2 percent to about 90 volume percent hydrogen although preferably from about 5 to 55 volume percent; from 2 percent to 50 volume percent oxygen although preferably from about 5 to 25 volume percent; and from 0 percent to about 95 volume percent although preferably from about 25 to 90 volume percent, of an inert gas especially high atomic weight inert gases such as noble gases, argon neon, krypton, and the like. Best results are obtain when the hydrogen molar concentration exceeds the oxygen concentration.

Indium oxide films sputtered in this atmosphere have been produced with resistances as low as about 15 ohms/square at film thicknesses of about 2500 angstroms. Especially good results from a commercial standpoint have been achieved when the sputtering atmosphere contains about 15 to 40 percent by volume of hydrogen, about 10 to 20 percent volume of oxygen, and from about 40 to 75 percent by volume of argon or other useful inert gas.

Although the exact theory of the invention is not completely understood, it is thought that hydrogen aids in producing the correct non-stoichiometric balance of oxygen to indium. Although such a ratio of oxygen to indium should be obtainable by adjusting the oxygen to argon ratio in a non-hydrogen gas mixture, the ratio of oxygen to argon is apparently so critical and temperature-sensitive that it has been found impossible to obtain and maintain in practice.

The deficiency of oxygen so produced in the indium oxide structure of films produced according to this invention leads to a high number of conduction electrons, a condition which is well known to physical science and which gives higher electrical conductivity. The electron concentration is increased further by free electrons supplied by the doping ingredient, e.g., tin, in the case of an indium oxide film.

For a better understanding of the invention, reference is now made to FIGURE 1 which depicts a typical sputtering apparatus. The sputtering apparatus is composed of a vacuum chamber 2 which contains a cathode 1 which is preferably constructed of the metal whose oxide is to be deposited on the substrate 3. The cathode, however, may be constructed of a conductive metal oxide. The substrate 3 is supported by a substrate 4 which may be heated to improve the properties of the metal oxide. The substrate support 4 can be grounded to form an anode and may be in the form of a heat exchanger so that the substrate can be cooled during sputtering. The cathode 1 is connected to a high-voltage supply 7 and rectifier 9 which create a high-potential differential between the cathode 1 and the substrate support 4 (anode). The high-potential differential provides the glow-discharge necessary to cause deposition of the metallic oxide from the cathode onto the substrate. The vacuum is obtained by a vacuum pump 5 which exhausts the vacuum chamber to a pressure of about 20 millitorr or lower. Higher pressure may be utilized, for example, up to 40 millitor and above; however, the applied voltage may require adjusting to achieve a suitable glow-discharge.

For the purposes of this invention, the vacuum chamber is equipped with an inlet port 6 for introducing inert and/or reactive gases into the vacuum chamber. After the proper vacuum is obtained, preferably a pressure of less than about $10^{-5}$ torr, the required atmosphere for sputtering is obtained by introduction of a small amount of the desired gas which frequently comprises at least a small quantity of an inert gas.

A typical procedure for depositing a metallic oxide film utilizing the above-described apparatus involves the application of about 2000 to 4000 volts to the cathode after the system has been evacuated to a pressure of about 20 millitorr. The voltage applied to the system is that necessary to obtain a suitable glow-discharge and, therefore, will vary with pressure, cathode to substrate distance, gas composition, and the like. A cathode of the dimensions of 12.5 centimeters by 12.5 centimeters is positioned 25 millimeters above a glass sample which is a 10 centimeter square. The indium cathode is cooled by cooling means 8 which is a miniature heat exchanger cooled by introduction of a cooling medium such as a cool gas or a cool liquid. As mentioned hereinabove, the substrate, or anode, may also be cooled and, in some instances, it is preferred to do so.

The atmosphere in the vacuum chamber may typically contain argon and hydrogen with wide variations of useful atmosphere composition being described hereinabove. The pressure of the vacuum chamber after introduction of the appropriate gases should be in the range of about 20 to 40 millitorr. The substrate temperature should be maintained in the range of about 300° C. or less, with temperatures as low as room temperature frequently preferred. Operation under these conditions results in formation of a transparent conductive film having a high conductivity. A wide range of operating conditions is feasible, attended by a wide variation in the properties of deposited films.

The invention described herein is especially useful in that it is especially adaptable for producing transparent metal oxide coatings of varying conductivities by varying the composition of the sputtering atmosphere.

Various types of metal oxide films may be deposited by the technique of this invention. Good films of oxides of a metal having an automic number between 48 and 51, for example, tin oxide, indium oxide, antimony oxide, and cadmium oxide, may be deposited by sputtering in an oxygen-hydrogen-containing atmosphere, with especially good results being achieved when argon or a similar inert gas is included in the gas composition. The invention has been found to be particularly effective in producing indium oxide films of surprisingly low resistivity.

The conductivity of the metal oxide films produced according to this invention is at least about an order of magnitude greater than that of the metal oxide films formed in an atmosphere containing no hydrogen. For example, as indicated above, transparent sputtered indium oxide films doped with tin generally have a mean resistance of about 50 ohms/square. However, tin "doped" indium oxide films of similar thicknesses have been produced by the teaching of this invention with resistances of less than about 5 ohms/square; a significant increase in the conductivity (the conductivity being the inverse of the resistivity of the film). Through optimization of the operating conditions, films of useful transparency having resistance as low as 5 ohms/square or lower are producible in reasonable industrial times.

In using the term "metal oxide" it is intended to refer to the higher valent and lower valent oxides of a metal where more than one valence state exists. Generally, it is the higher valent metal oxide which is present in the deposited film. However, substantial quantities of the lower valent oxide may be present. For example, tin oxide films are believed to consist primarily of stannic oxide, although minor quantities of stannous oxide may be present, especially when a deficiency of oxygen exists in the sputtering atmosphere.

The operating conditions for the sputtering process of this invention are similar to those of prior art sputtering processes. A minimum voltage of about 50 volts is required to achieve a glow discharge while a minimum voltage of about 100 volts is required to achieve a build up of metal oxide deposits within a reasonable time. A preferred operating voltage is above at about 1000 volts and, for commercial operations, a voltage of over 1500 volts is recommended.

The distance maintained between metal cathode and substrate varies with the cathode area, power utilized, gas pressure, and the like. Usual distances are 20 to 100 millimeters although greater and lesser distances may be utilized.

The operating pressure is generally about 20 millitorr, although slightly lower pressures may be used. Also, pressures of the order of 100 millitorr or higher may be successfully utliized. The process is operable at lower pressures in the presence of a magnetic field. The utilization of higher pressures involves increased collisions between the migrating particles and the gas atoms of the atmosphere, thereby diminishing the rate of deposition. Also, it is generally desirable to maintain the pressure above 20 millitorr when distances between cathode and substrate are at a maximum and to maintain the pressure less than about 100 millitorr when maximum voltages are used.

The content of the sputtering atmosphere may be varied considerably. An inert gas such as argon, nitrogen, or the like may or may not be present. The heavier inert gas ions enhance the sputtering rate and for this reason are preferably present, especially in commercial processes.

As previously indicated, the cathode comprises a metal having an atomic number between 48 and 51, that is, cadmium, indium, tin, and antimony. These metals should be substantially pure when used for sputtering, although particular impurities may enhance the sputtering rate. For example, a metal of higher atomic weight in minor quantities, that is, up to about 20 percent by weight, and preferably of less than 15 percent by weight of the total cathode weight, enhances the sputtering rate.

The substrate temperature may be controlled by cooling, if desired. By cooling the substrate, additional power may be applied and the sputtering rate thereby increased.

FIGURE 2 depicts the effect of the sputtering atmosphere on film resistance in a hydrogen-oxygen-argon system. The resistances reported on the tri-axial graph do not consider film thickness inasmuch as they are reported in ohms/square. The films ranged in thickness from second order red to third order green. However, this slight difference in thickness would not account for wide variations in resistance.

The results depicted on FIGURE 2 were obtained by sputtering in various gas compositions from a cathode containing 94.4 percent by weight indium and 5.6 percent by weight tin at 3500 volts D.C. at 750 milliamperes for 40 minutes. The substrate was cooled with water having a temperature of 20° C. with a cathode-to-substrate distance of 42 mm.

Although the presence of argon in the sputtering atmosphere would affect film thickness, which would indirectly affect the resistance when reported as ohms/square, it may be ignored in determining operating guides for optimum oxygen-hydrogen gas compositions.

A study of the hydrogen to oxygen volume ratio (also molar ratio) reveals that higher resistances are obtained when that ratio is about 1:1 or greater, that is, when hydrogen is present in equal or greater volume than oxygen. This generally appears true regardless of the quantity of argon present. Best results occur when the hydrogen-to-oxygen volume ratio is 2:1 or greater. The area to the right of the line C–c represents gas compositions having a hydrogen-to-oxygen volume concentration of 1:1 or greater.

EXAMPLE I

An indium oxide film was formed by sputtering from an indium cathode containing 5.6 percent by weight tin in an atmosphere containing 25 percent by volume of oxygen, 50 percent by volume of argon, and 20 percent by volume of hydrogen at a pressure of about 40 millitorr. The applied voltage was 2100 volts D.C. at 750 milli-amps. The distance from the cathode to the substrate was 23 millimeters. The substrate sample was 4 inches by 4 inches.

After sputtering for a period of one hour, a film of about 5000 angstroms having a resistance of about 20 ohms/square was produced.

EXAMPLE II

An experiment similar to Example I was conducted wherein the substrate was cooled by passing cooling water (20° C.) through the substrate support. The cathode and sputtering atmosphere were identical to Example I. A voltage of 3400 volts D.C. at 750 milli-amps was applied for a period of 40 minutes. An indium oxide film of about 5000 angstroms having a resistance of 10 ohms/square was produced.

EXAMPLE III

A low resistance indium oxide film was formed on a 4 inches by 4 inches thick glass which had been strengthened by ion exchange below the strain point. The cathode and anode were cooled with water at a temperature of 20° C. The cathode composition was 94.6 percent indium and 5.6 percent tin. The anode to cathode spacing was 40 millimeters and the power applied was 3500 volts D.C. at 750 milli-amps.

The sputtering chamber contained 65 percent by volume of argon, 25 percent by volume of hydrogen, and 10 percent by volume of oxygen at a pressure of 40 millitorr. Sputtering was conducted for a period of 15 minutes.

The film produced had a visible light transmission of 80–85 percent and was 2750 angstroms thick. The film was uniform and had a resistance of 15 ohms/square.

EXAMPLE IV

Additional indium oxide films were sputtered from an indium cathode containing 5.6 percent tin positioned 23 mllimeters from the substrate wherein the power applied was 2000 volts D.C. at 750 milli-amps.

In experiment A the gas composition comprised 1 part by volume hydrogen, 3 parts by volume argon, and 1 part by volume oxygen at 65–75 millitorr pressure. Sputtering was conducted for a period of 40 minutes and the substrate was observed to reach a temperature of 297° C. The resulting film was cooled in vacuum and exhibited a resistance of 16 ohms/square and a film thickness of fourth green.

Experiment B comprised sputtering for 34 minutes in an atmosphere comprising 1 part by volume of oxygen, 1 part by volume hydrogen, and 3 parts by volume of argon at a pressure of 60 millitorr. The resulting film was cooled in vacuum and had a resistance of 39 ohms/square.

EXAMPE V

For comparison purposes, tin oxide films were formed by sputtering from a tin cathode containing 7.5 percent antimory at a power of 2200 volts D.C. at milli-amps.

In experiment A, a film was formed by sputtering for 40 minutes in an atmosphere of 1 part by volume of oxygen, 1 part by volume of hydrogen, and 3 parts by volume argon at a pressure of 62 to about 70 millitorr. The substrate temperautre raised to about 260° C. during sputtering. A film was formed with good optical quality having a resistance of about 900 ohms/square.

In experiment B, a tin oxide film was formed by sputtering for 40 minutes in an atmosphere of 3 parts by volume of argon, 1 part by volume hydrogen, and 1 part by volume oxygen at a pressure of 60 to 70 millitorr. A resulting film had a resistance of 500 ohms/square after being cooled in hydrogen.

EXAMPLE VI

In Table I of this example, results are tabulated of sputtering experiments conducted with varied voltages, gas composition, and anode temperatures in accordance with instant invention.

In Table II of this example, results are tabulated for indium oxide films formed in an oxygen-argon atmosphere. These films may be used for comparison with films formed according to the teaching of the instant invention.

TABLE I

| Sample | Cathode | Gas composition (parts by volume) | | | Power | | Cathode to anode, mm. | Operating pressure (microns) | Sputtering time (min.) | Anode temp. (° C.) | Resistance, ohms/sq. | Thickness |
|---|---|---|---|---|---|---|---|---|---|---|---|---|
| | | O₂ | H₂ | A | Voltage (D.C.) | Current (ma.) | | | | | | |
| A [1] | 5.6% Sn in In | 1 | 1 | 3 | 2,100 | 750 | 23 | 58 | 40 | 281 | 42 | Not measured. |
| B [2] | do | 1 | 1 | 3 | 2,100 | 750 | 23 | 58 | 40 | 20–275 | 40 | Do. |
| C | do | 1 | 1 | 3 | 2,200 | 750 | 23 | 46 | 40 | 20–298 | 20 | 5th green. |
| D [3] | do | 1 | 2 | 3 | 3,000–3,100 | 750 | 36 | 35 | 40 | ([5]) | 20 | 3rd red to 4th green. |
| E [4] | do | 1 | 1 | 3 | 3,100 | 750 | 36 | 34 | 40 | ([5]) | 40 | 4th green. |

[1] Sample A was cooled in hydrogen after film was formed.
[2] Sample B was cooled in vacuum after film was formed.
[3] Sample D was sputtered onto a cooled substrate.
[4] Sample E was sputtered onto a cooled substrate.
[5] Not recorded.

TABLE II

| Sample | Percent Sn in Sn-In alloy | Percent O₂ in O₂-A mixture | Power | | Cathode to Anode, mm. | Operating pressure Torr | Time (min.) | Anode temp., ° C. | Film color by reflectance | Resistance ohms/sq. |
|---|---|---|---|---|---|---|---|---|---|---|
| | | | Voltage | MA | | | | | | |
| A | 3.18 | 75 | 2,500 | 750 | 27 | 0.045 | 60 | 340 | 6th green | 60 |
| B | 5.64 | 95 | 2,500 | 750 | 27 | 0.046 | 60 | 397 | do | 35 |
| C | 11.3 | 35 | 2,500 | 750 | 27 | 0.050 | 60 | 318 | 5th green | 50 |
| D | 11.3 | 75 | 2,500 | 750 | 27 | 0.050 | 60 | 300 | 5th red | 82 |
| E | 11.3 | 75 | 3,200 | 600 | 27 | 0.075 | 60 | 396 | 7th green | 40 |

EXAMPLE VII

A tin oxide film was sputtered onto a cooled 4″ x 4″ glass substrate from a cathode containing 10.6 percent antimony and 89.4 percent tin. The power applied was 3400 volts D.C. at 750 milli-amps. Cathode-to-substrate distance was 42 millimeters.

The gas atmosphere was three parts by volume of argon, two parts by volume of hydrogen, and one part by volume of oxygen at a pressure of about 40 millitorr.

The resulting tin oxide film had a resistance of 2000 ohms/square at a film thickness of third red.

While the above films have been described as useful because of their electroconductivity, numerous other uses exist, for example, in transparent form as light and heat reflective and absorptive films, in opaque form as mirrors, heating elements, and the like. The increased electroconductivity of these metal oxide films is important when they are used as heat screens since it is known that the light reflectance and absorption of such films increases with increasing electroconductivity.

The term ohms per square has been used hereinabove to describe the conductivity of the films formed by the novel process of this invention. Although specific resistivity is usually utilized to describe or compare the conductivity of materials, it is inappropriate for describing the conductivity of very thin films because of the difficulty of measuring the thickness of the film.

Specific resistance is the resistance between opposite faces of a cubic centimeter of material and is expressed by the equation $$\rho = \frac{R \times A}{L}$$

where $\rho$ is the specific resistance, R is the resistance of the conductor, A is the cross-sectional area of the conductor, and L is the length of the conductor. For a thin film, this expression becomes $$\rho = \frac{R \times W \times t}{L}$$

wherein W and L are the surface dimensions and $t$ is the film thickness. For a square area of surface, W and L are equal and $\rho = R \times t$ or R (resistance for a square area of surface) $= \rho/t$. Thus, the conductivities of various types of films having approximately equivalent thickness may be directly compared by comparing resistance per square.

The thickness of a thin film may be determined by the interference color shown in reflected light, provided the index of refraction is known. For stannic oxide films, a second-order red color indicates a thickness of about 230 millimicrons while a second-order blue color indicates a thickness of about 100 millimicrons. As the thickness of the film increases, its apparent color changes and the order or succession of the colors with increasing thickness is analogous to that of the well-known Newton rings described in The Theory of Optics by Paul Drude, Dover Publications, Inc., New York, at p. 136 et seq.

Although specific embodiments of the invention have been set forth hereinabove, the invention is not limited solely thereto, but includes all the variations coming within the scope of the following claims.

What is claimed is:

1. A method for forming on a substrate a conductive oxide film of one or more metals having an atomic number of 48 to 51 comprising feeding into a sputtering apparatus a gaseous composition containing reactive gases consisting essentially of hydrogen and oxygen, wherein both the hydrogen and oxygen are present as at least 2 percent by volume of the gas composition, the volumetric ratio of hydrogen to oxygen being greater than 2:1, and sputtering a target consisting essentially of one or more metals having an atomic number of 48 to 51 in said gaseous composition.

2. The method of claim 1 wherein the metal is indium.

3. The method of claim 2 wherein the atmosphere comprises about 5 to about 55 percent by volume of hydrogen, about 2 to about 25 percent by volume of oxygen and about 25 to 90 percent by volume of a high atomic weight inert gas.

4. The method of claim 1 wherein the atmosphere contains at least 25 percent by volume of an inert gas.

5. The method of claim 4 wherein said inert gas is argon.

6. The method of claim 1 wherein the substrate is glass.

7. The method of claim 6 wherein the substrate temperature is maintained at less than about 300° C. to form a metal oxide film that is transparent.

8. A method as claimed in claim 1 wherein said substrate temperature is maintained at less than about 300° C.

9. The method of claim 1 wherein said metal is a mixture of indium and tin.

10. The method of claim 1 wherein said metal is a mixture of tin and antimony.

References Cited

UNITED STATES PATENTS 3,419,761  12/1968  Pennebaker _____ 204—192

(Other references on following page)

References Cited

| | | | |
|---|---|---|---|
| 3,418,229 | 12/1968 | Lakshmanan et al. | 204—192 |
| 3,400,066 | 9/1968 | Caswell et al. | 204—192 |
| 3,388,053 | 6/1968 | Sinclair et al. | 204—192 |
| 3,121,852 | 2/1964 | Boyd et al. | 204—192 |
| 2,825,687 | 3/1958 | Preston et al. | 204—192 |
| 2,189,580 | 2/1940 | Hewlett. | |

FOREIGN PATENTS 565,153  8/1958  Canada.

JOHN H. MACK, Primary Examiner

S. KANTER, Assistant Examiner

U.S. Cl. X.R.

117—201